(12) United States Patent
Mohamad et al.

(10) Patent No.: US 11,442,939 B2
(45) Date of Patent: Sep. 13, 2022

(54) CONFIGURABLE AND INCREMENTAL DATABASE MIGRATION FRAMEWORK FOR HETEROGENEOUS DATABASES

(71) Applicant: Groupon, Inc., Chicago, IL (US)

(72) Inventors: Azmath Mohamad, Bangalore (IN); Chirag Modi, Bangalore (IN); Phani Kumar Bhogaraju, Bangalore (IN)

(73) Assignee: Groupon, Inc., Chicago, IL (US)

( * ) Notice: Subject to any disclaimer, the term of this patent is extended or adjusted under 35 U.S.C. 154(b) by 36 days.

(21) Appl. No.: 17/075,893

(22) Filed: Oct. 21, 2020

(65) Prior Publication Data
US 2021/0109934 A1    Apr. 15, 2021

Related U.S. Application Data

(63) Continuation of application No. 15/473,091, filed on Mar. 29, 2017, now Pat. No. 10,909,120.

(60) Provisional application No. 62/315,086, filed on Mar. 30, 2016.

(51) Int. Cl.
| | | |
|---|---|---|
| *G06F 16/00* | (2019.01) | |
| *G06F 16/2455* | (2019.01) | |
| *G06F 16/84* | (2019.01) | |
| *G06F 16/21* | (2019.01) | |
| *G06F 16/25* | (2019.01) | |

(52) U.S. Cl.
CPC ...... *G06F 16/24554* (2019.01); *G06F 16/214* (2019.01); *G06F 16/258* (2019.01); *G06F 16/86* (2019.01)

(58) Field of Classification Search
None
See application file for complete search history.

(56) References Cited

U.S. PATENT DOCUMENTS

| | | | |
|---|---|---|---|
| 5,758,337 A | 5/1998 | Hammond | |
| 6,081,811 A | 6/2000 | Nilsson | |
| 6,151,608 A * | 11/2000 | Abrams | G06F 16/214 |
| | | | 707/999.1 |

(Continued)

OTHER PUBLICATIONS

Elke Radeke, Marc H. Scholl "Functionality for Object Migration Among Distributed, Heterogeneous, Autonomous DBS". 1995, IEEE (Year: 1995).*

(Continued)

*Primary Examiner* — Polina G Peach
(74) *Attorney, Agent, or Firm* — Alston & Bird LLP

(57) ABSTRACT

Various methods are provided for facilitating heterogeneous database migration. One example method may comprise accessing a migration configuration file, the migration configuration file comprising information indicative of at least a source database type of a source database, connection information of accessing the source database, a destination database type of a destination database, and connection information for accessing the destination database, generating configuration data based on the source database type and the destination database type to generate a mapping of a source database table stored within the source database to a destination database table stored within the destination database, and generating a query for execution on the source database enabling data migration from the source database to the destination database.

21 Claims, 4 Drawing Sheets

(56) References Cited

U.S. PATENT DOCUMENTS

| | | | |
|---|---|---|---|
| 6,529,909 B1 | 3/2003 | Bowman-Amuah | |
| 7,165,088 B2 | 1/2007 | Cohen et al. | |
| 7,620,665 B1 | 11/2009 | George et al. | |
| 7,716,441 B2* | 5/2010 | Kano | G06F 3/067 |
| | | | 711/204 |
| 8,037,108 B1 | 10/2011 | Chang | |
| 8,185,712 B2 | 5/2012 | Sarkar et al. | |
| 8,407,237 B1 | 3/2013 | Kudryavtsev et al. | |
| 8,812,448 B1 | 8/2014 | Anderson et al. | |
| 8,869,136 B2 | 10/2014 | Chapman et al. | |
| 9,122,716 B1 | 9/2015 | Naganathan et al. | |
| 9,229,942 B1* | 1/2016 | MacNeill | G06F 16/119 |
| 9,513,835 B2 | 12/2016 | Alatorre et al. | |
| 9,514,163 B2* | 12/2016 | Farr | G06F 16/214 |
| 10,162,610 B2 | 12/2018 | Apte et al. | |
| 2005/0165817 A1 | 7/2005 | O'Conor | |
| 2005/0198074 A1 | 9/2005 | Khayter et al. | |
| 2005/0251812 A1 | 11/2005 | Hayward | |
| 2006/0026012 A1* | 2/2006 | Campbell | G06Q 10/10 |
| | | | 702/182 |
| 2006/0080082 A1 | 4/2006 | Ravindra et al. | |
| 2006/0235899 A1 | 10/2006 | Tucker | |
| 2007/0179983 A1 | 8/2007 | Putman | |
| 2008/0235300 A1 | 9/2008 | Nemoto et al. | |
| 2009/0077114 A1 | 3/2009 | Zachariah | |
| 2011/0110568 A1 | 5/2011 | Vesper et al. | |
| 2012/0265726 A1 | 10/2012 | Padmanabhan et al. | |
| 2013/0311740 A1* | 11/2013 | Watanabe | G06F 3/0685 |
| | | | 711/E12.002 |
| 2014/0244654 A1* | 8/2014 | Gao | G06F 16/951 |
| | | | 707/741 |
| 2014/0279890 A1* | 9/2014 | Srinivasan | G06F 16/254 |
| | | | 707/626 |
| 2015/0006490 A1* | 1/2015 | Balasubramanian | |
| | | | G06F 16/2365 |
| | | | 707/690 |
| 2015/0120672 A1* | 4/2015 | Joglekar | G06F 3/0647 |
| | | | 707/667 |
| 2015/0248403 A1* | 9/2015 | Pazdziora | G06F 16/214 |
| | | | 707/809 |
| 2016/0202933 A1* | 7/2016 | Alatorre | G06F 3/0683 |
| | | | 711/154 |
| 2016/0283493 A1* | 9/2016 | Wideman | G06F 16/119 |
| 2016/0321275 A1* | 11/2016 | Yap | G06F 16/119 |
| 2017/0185661 A1 | 6/2017 | Belyy et al. | |
| 2017/0269869 A1* | 9/2017 | Aerts | G06F 3/0647 |

OTHER PUBLICATIONS

U.S. Appl. No. 15/473,091, filed Mar. 29, 2017, Allowed.
Brodie et al. "DARWIN: On the Incremental Migration of Legacy Information Systems", Mar. 1993, Technical Memorandum of Electronics Research Laboratory, College of Engineering, University of California, Berkeley (Year: 1993).

* cited by examiner

CONFIGURABLE AND INCREMENTAL DATABASE MIGRATION FRAMEWORK FOR HETEROGENEOUS DATABASES

CROSS-REFERENCE TO RELATED APPLICATIONS

This application is a continuation of U.S. patent application Ser. No. 15/473,091, titled "CONFIGURABLE AND INCREMENTAL DATABASE MIGRATION FRAMEWORK FOR HETEROGENEOUS DATABASES," filed on Mar. 29, 2017, which claims benefit under 35 USC 119 (e) of U.S. provisional Application No. 62/315,086, filed Mar. 30, 2016, the entire content of which is incorporated herein by reference.

FIELD

Embodiments of the invention relate, generally, to facilitating heterogeneous database migration, and more specifically for a system, method, apparatus, and computer program product for providing a configurable and incremental database migration framework for heterogeneous databases.

BACKGROUND

The applicant has discovered problems with current methods, systems, and apparatuses for providing heterogeneous database migration. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods and computer readable media for facilitating improved heterogeneous database migration. Some embodiments provide for more specifically to a system, method, apparatus, and computer program product for providing a configurable and incremental database migration framework to facilitate heterogeneous database migration.

In some embodiments, an apparatus for facilitating heterogeneous database migration may be provided, the apparatus comprising at least one processor and at least one memory including computer program code, the at least one memory and the computer program code configured to, with the processor, cause the apparatus to at least access a migration configuration file, the migration configuration file comprising information indicative of at least a source database type of a source database, connection information of accessing the source database, a destination database type of a destination database, and connection information for accessing the destination database, generate configuration data based on the source database type and the destination database type to generate a mapping of a source database table stored within the source database to a destination database table stored within the destination database, and generate a query for execution on the source database enabling data migration from the source database to the destination database.

In some embodiments, the first database type is different than the second database type. In some embodiments, the at least one memory and the computer program code are further configured to, with the processor, cause the apparatus to execute the query on the source database to extract data, frame the data into an insert format, and cause storage of the data, in the insert format, in the destination database. In some embodiments, the at least one memory and the computer program code configured for framing the query is further configured to, with the processor, cause the apparatus to call a function for manipulating data values stored in the source database table or any data exchange formats in advance of causing storage of the data in the destination database table. In some embodiments, the at least one memory and the computer program code configured for framing the query is further configured to, with the processor, cause the apparatus to call a function configured for supporting data migration from a plurality of source database tables, the function configured for supporting data migration from the plurality of source database tables comprising receiving information indicative of each of the plurality of source database table, receiving information indicative of the destination database, and an order in which the plurality of source database tables join in the destination database.

In some embodiments, the at least one memory and the computer program code are further configured to, with the processor, cause the apparatus to populate temporary tables in an instance in which a table is having primary key to maintain referential integration.

In some embodiments, the at least one memory and the computer program code are further configured to, with the processor, cause the apparatus to preceding accessing the migration configuration file, generate the migration configuration file, wherein generation of the migration configuration file comprises receiving source database connection information, receiving destination database connection information, and confirming connectivity to the source database and the destination database.

In some embodiments, a method for facilitating heterogeneous database migration may be provided, the method comprising accessing a migration configuration file, the migration configuration file comprising information indicative of at least a source database type of a source database, connection information of accessing the source database, a destination database type of a destination database, and connection information for accessing the destination database, generating configuration data based on the source database type and the destination database type to generate a mapping of a source database table stored within the source database to a destination database table stored within the destination database, and generating a query for execution on the source database enabling data migration from the source database to the destination database.

In some embodiments, the first database type is different than the second database type. In some embodiments, the method may further comprise executing the query on the source database to extract data, framing the data into an insert format, and causing storage of the data, in the insert format, in the destination database. In some embodiments, framing the query comprises calling a function for manipulating data values stored in the source database table or any data exchange formats in advance of causing storage of the data in the destination database table. In some embodiments, framing the query comprises calling a function configured for supporting data migration from a plurality of source database tables, the function configured for supporting data migration from the plurality of source database tables comprising receiving information indicative of each of the plurality of source database table, receiving information indicative of the destination database, and an order in which the plurality of source database tables join in the destination database.

In some embodiments, the method may further comprise populating temporary tables in an instance in which a table is having primary key to maintain referential integrity. In some embodiments, the method may further comprise preceding accessing the migration configuration file, generating the migration configuration file, wherein generation of the migration configuration file comprises receiving source database connection information, receiving destination database connection information, and confirming connectivity to the source database and the destination database.

In some embodiments, a computer program product for facilitating heterogeneous database migration may be provided, the computer program product comprising at least one non-transitory computer-readable storage medium having computer-executable program code instructions stored therein, the computer-executable program code instructions comprising program code instructions for accessing a migration configuration file, the migration configuration file comprising information indicative of at least a source database type of a source database, connection information of accessing the source database, a destination database type of a destination database, and connection information for accessing the destination database, generating configuration data based on the source database type and the destination database type to generate a mapping of a source database table stored within the source database to a destination database table stored within the destination database, and generating a query for execution on the source database enabling data migration from the source database to the destination database.

In some embodiments, the first database type is different than the second database type. In some embodiments, the computer-executable program code instructions further comprise program code instructions for executing the query on the source database to extract data, framing the data into an insert format, and causing storage of the data, in the insert format, in the destination database. In some embodiments, the computer-executable program code instructions configured for framing the query further comprise program code instructions for calling a function for manipulating data values stored in the source database table or any data exchange formats in advance of causing storage of the data in the destination database table. In some embodiments, the computer-executable program code instructions configured for framing the query further comprise program code instructions for calling a function configured for supporting data migration from a plurality of source database tables, the function configured for supporting data migration from the plurality of source database tables comprising receiving information indicative of each of the plurality of source database table, receiving information indicative of the destination database, and an order in which the plurality of source database tables join in the destination database.

In some embodiments, the computer-executable program code instructions further comprise program code instructions for populating temporary tables in an instance in which a table is having primary key to maintain referential integration. In some embodiments, the computer-executable program code instructions further comprise program code instructions for preceding accessing the migration configuration file, generating the migration configuration file, wherein generation of the migration configuration file comprises receiving source database connection information, receiving destination database connection information, and confirming connectivity to the source database and the destination database.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Overview

Figure 1:
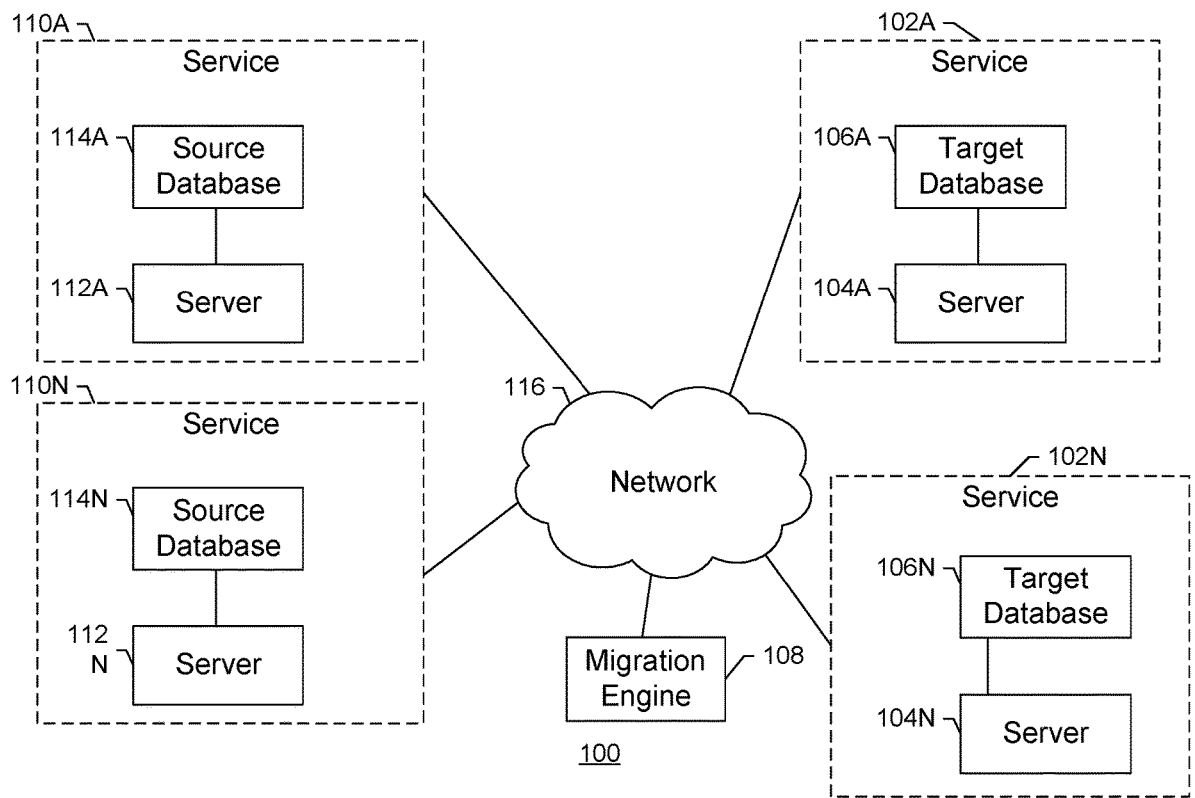
FIG. 1 shows an example system within which embodiments of the present invention may operate.

Various embodiments of the present invention are directed to improved systems, apparatuses, methods, and computer readable media for heterogeneous database migration. In this regard, embodiments of the present invention provide systems, devices, methods, and computer readable media for providing a configurable and incremental database migration framework to facilitate heterogeneous database migration.

That is, by being provided connection information and a database type of the source and destination databases (MySQL, PostgreSQL, or the like), embodiments of the present invention may perform database migration. Whereas conventionally, a user would have to know, for example semantically, how to perform data manipulation in both the source and destination database, features of the present invention include a framework which can be configurable and developed in any programming language/independent of programming language. The present invention does not require a user to possess any database knowledge for execution. Furthermore, the present invention may be configured to call configurable functions which can have complex logic, whereas the same cannot be achieved through stored procedures. The present invention may be further configured such that changes are easy to accommodate in that, for example, a user does not need to login to a server to make changes or execute. The present invention may further be configured such that primary key and foreign key constrains are maintained within an intermediate temporary table. Migration may be divided into subparts and, in some embodiments, executed in many parallel threads based on limit and offset.

Furthermore, the present invention may be configured such that, for example, CSV, XML, or JSON files may be imported into database using the same configurations. Moreover, the present invention may be configured such that, based on the logs and/or status, when failure, a pointer can be set to specific record from where the migration to start again. Furthermore, the present invention may be configured such that data may be migrated to multiple and different target databases at the same time.

Definitions

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

As used herein, the term "database" may refer to any organized collection of data. A database, as referred to herein, is organized such that information may be accessed via a query (e.g., the location of each of a plurality of consumers or merchants may be organized such that each consumer in a particular location may be queried).

As used herein, the term "database type" may refer to any database management system. For example, a database type may refer to a computer software application that interacts with the user, other applications, and the database itself to capture and analyze data (e.g., conventional database management software such as MySQL, POSTGRES or the like)

Technical Underpinnings and Implementation of Exemplary Embodiments

Though data migration has become an integral and necessary part of IT department operations in today's business environment, it often causes major disruptions as a result of data quality and application performance problems. Encountering these problems and subsequently identifying solutions can severely impact budgets. Unfortunately data migration options are limited and particularly so between heterogeneous databases. For example, due to the speed at which new technologies are created and introduced to the market, backwards compatibility to legacy technologies is often not considered. That is, data created and stored by existing legacy technologies are burdened by not only their inherit limitations, but also by lack of compatibility with existing technologies. However, as demand for data analysis and reporting continues to grow, the data created and stored by existing legacy technologies is needed for completeness. For example, data related to health care systems and financial institutions will need be preserved as the newer systems are created and implemented. Moreover, the time and money invested in maintaining and supporting legacy systems is not sustainable.

While some solutions do exist (e.g., software bridges used to facilitate transition away from older database technologies), several limitations preclude their practical viability. For instance, any software bridge requires a thorough knowledge of both systems and, for each migration, a complete work up is necessary based on the particulars. As such, the cost of such a solution is often prohibitory. Hence there exists a need for a simpler, more intuitive system, which can be used with any combination of heterogeneous databases, not require expert knowledge of both the legacy and new technology, and provide integration to newer technology.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Users may access any of one or more first services 102A-N and/or any of one or more second services 110A-N via a network 116 (e.g., the Internet, or the like) using a migration engine 108. Moreover, the first service 102A-N may comprise a server 104 in communication with a source database 106 and the one or more second services 110A-N may comprise servers 112A-N in communication with target databases 114A-N.

Both the server 104 and servers 112A-N may be embodied as a computer or computers as known in the art. The servers 104 and 112A-N may provide for receiving of electronic data from various sources, including but not necessarily limited to the migration engine 108. Generally, the server 104 may facilitate e-commerce transactions based on transaction information provided by various merchant devices or the like.

Databases 106 and 114A-N may be embodied as a data storage device such as a Network Attached Storage (NAS) device or devices, or as a separate database server or servers. Databases 106 and 114A-N may include information accessed and stored by the servers 104 and 112A-N to facilitate the operations of the services 102A-N and 110A-N respectively. For example, the databases 106 and 114A-N may include, without limitation, user account credentials for system administrators, merchants, and consumers, data indicating the products and promotions offered by the service, clickstream data, analytic results, reports, financial data, and/or the like.

Migration engine 108 may be any computing device as known in the art and operated by a user. In embodiments where migration engine 108 is a mobile device, such as a smart phone or tablet, the migration engine 108 may execute an "app" to interact with any of services 102A-N. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

Additionally or alternatively, migration engine 108 may interact through the any of services 102A-N via a web browser. As yet another example, migration engine 108 may include various hardware or firmware designed to interface with any of services 102A-N (e.g., where the migration engine 108 is a purpose-built device offered for the primary purpose of communicating with any of services 102A-N).

Example Apparatus for Implementing Embodiments of the Present Invention

Figure 2:
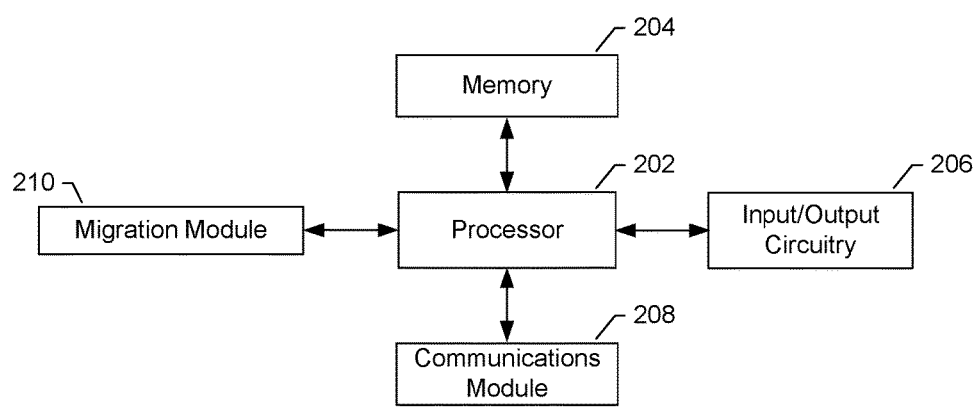
FIG. 2 shows a block diagram showing an example device for implementing a configurable and incremental database migration framework to facilitate heterogeneous database migration using special-purpose circuitry in accordance with some exemplary embodiments of the present invention.

Migration engine 108 may be embodied by one or more computing systems, such as apparatus 200 shown in FIG. 2. As illustrated in FIG. 2, the apparatus 200 may include a processor 202, a memory 204, input/output circuitry 206, communications circuitry 208, and migration module 210. The apparatus 200 may be configured to execute the operations described above with respect to FIG. 1 and below with respect to FIGS. 3 and 4. Although these components 202-210 are described with respect to functional limitations, it should be understood that the particular implementations necessarily include the use of particular hardware. It should also be understood that certain of these components 202-210 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Migration module 210 includes hardware configured to provide a configurable and incremental database migration framework for heterogeneous databases and perform/facilitate database (e.g., heterogeneous database) migration. The migration module 210 may utilize processing circuitry, such as the processor 202, to perform these actions. The migration module 210 may receive the data via a network interface provided by the communications circuitry 208. However, it should also be appreciated that, in some embodiments, the migration module 210 may include a separate processor, specially configured field programmable gate array (FPGA), or application specific interface circuit (ASIC) to perform the database migration and/or provide database migration framework. The migration module 210 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Operations for Implementing Embodiments of the Present Invention

Figure 3:
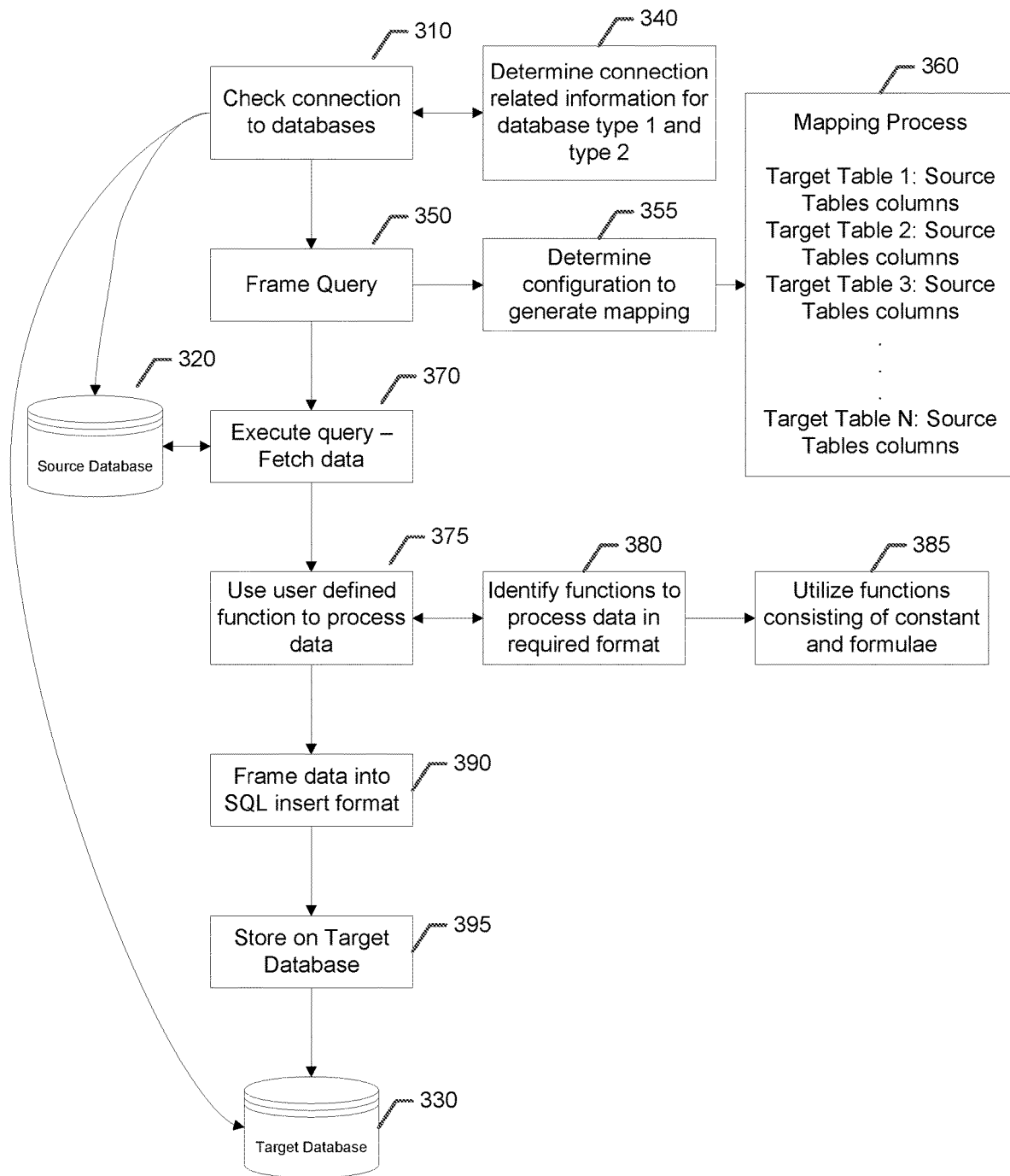
FIG. 3 shows a flow diagram depicting an exemplary embodiment of performing database migration, in accordance with some exemplary embodiments of the present invention.
Figure 4:
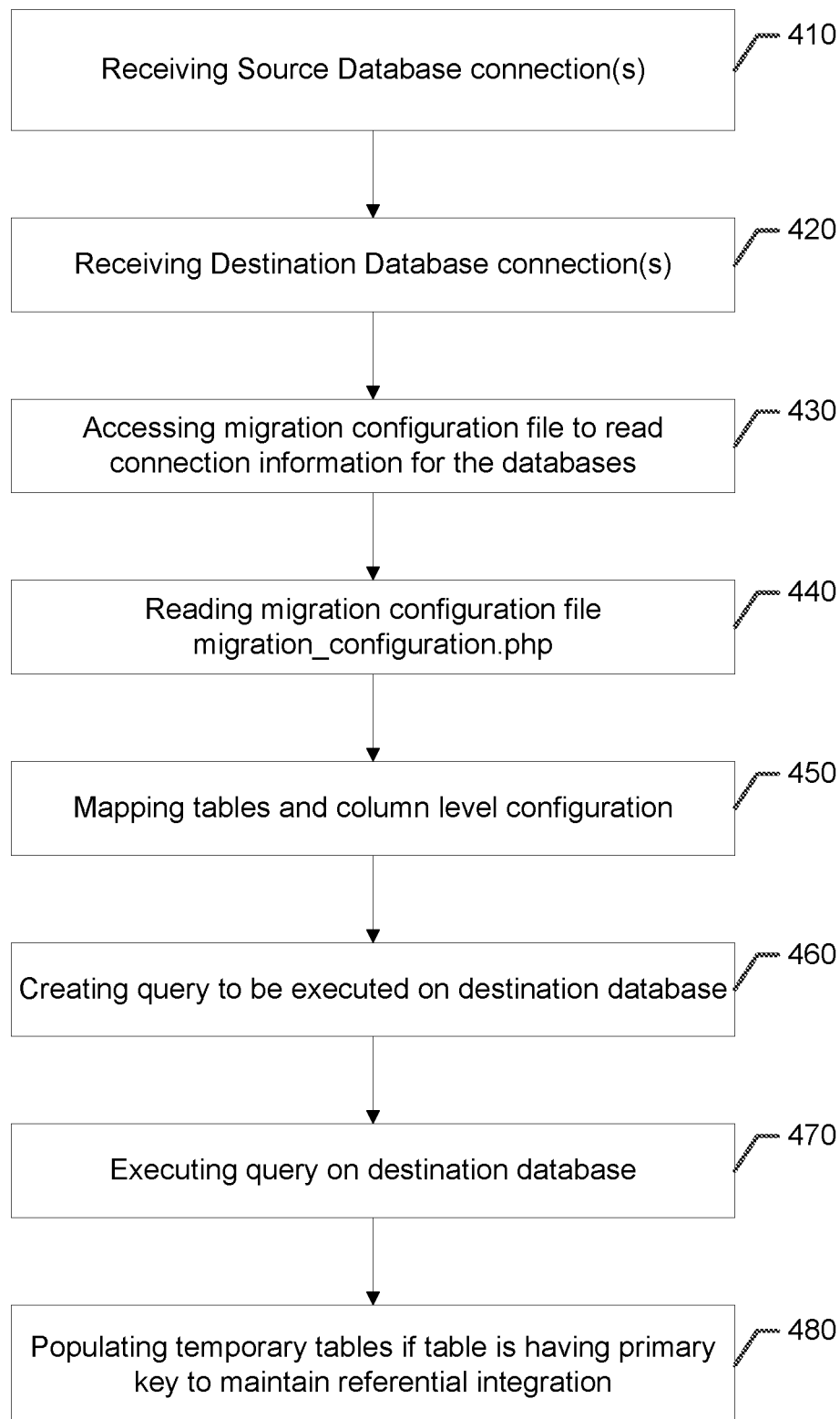
FIGS. 4 and 5 show flow diagrams depicting exemplary methods for implementing a configurable and incremental database migration framework to facilitate heterogeneous database migration in accordance with some exemplary embodiments of the present invention.

In some embodiments, the system may be configured to a configurable and incremental database migration framework to facilitate heterogeneous database migration. FIGS. 3 and 4 illustrate exemplary processes for receiving, for example, user input identifying at least one source database and one destination database, and, upon reception of a command, performing heterogeneous database migration. FIG. 3 shows an example method that may be executed by one or more machines, for example by apparatus 200, including migration module 210 of FIG. 2, for facilitating database migration, in accordance with some embodiments discussed herein.

Providing a Configurable and Incremental Database Migration Framework

FIG. 3 illustrates a flow diagram depicting an example of a process 300 for facilitating database migration in accordance with embodiments of the present invention. The process illustrates how, upon reception of information related to source database(s) and destination (or target database(s)), a query may be generated and database migration may be performed. The process 300 may be performed by an apparatus, such as the apparatus 200 described above with respect to FIG. 2.

As shown in block 310 of FIG. 3, an apparatus, such as apparatus 200, may be configured for checking or otherwise confirming connectivity or accessibility to one or more databases, including in some embodiments, a source database 320 and a destination database 330. For example, the apparatus may be configured to confirm connectivity via any network connection (e.g., WIFI, hardwired or cellular). In some embodiments, to confirm connectivity/accessibility, as shown in block 340 of FIG. 3, the apparatus, such as apparatus 200, may be configured for accessing, receiving, or otherwise determining connection related information for each of a plurality of databases, including, for example, a first database having a first database type (e.g., the first database being a source database and the first database type being the type of database) and a second database having a second database type (e.g., the second database being a destination database and the second database type being the type of the second database). In some embodiments, block 310 may involve checking three or more connections and block 340 may include additional database types. For example, the apparatus may support heterogeneous database migration from a source database to a plurality of destination database or, in some embodiments, from a plurality of source databases to one or more destination databases. While the description refers to a source database and source database type, one of ordinary skill in the art would appreciate that the present invention may facilitate database migration from, for example, CSV, XML, or JSON files as well as any standard that facilitates data interchange.

Once the apparatus is provided with connection information to each database and has confirmed connectivity/accessibility, the process 300 proceeds to block 350, where a query may be generated. That is, as shown in block 350 of FIG. 3, an apparatus, such as 200, may be configured for framing a query. The query may be framed based on types of databases involved in the data migration. For example, the query may be a function of the first database type and the second database type. Where more than one source database and/or more than one destination databases are involved, in some embodiments, a plurality of queries may be framed. That is, each query may be directed to a particular source database, a particular destination database, or in some embodiments, to a particular combination of a particular source database and a particular destination database.

In some embodiments, framing the query may involve determining configuration data to generate a mapping. As shown in block 355 of FIG. 3, an apparatus, such as 200, may be configured for determining configuration data to generate a mapping. That is, a process of data migration may comprise analyzing the source database and the target database to produce configuration data, the configuration data being used for generating a mapping of the source database to a target database, which may enable the migration of, for example, at least one table, or portion thereof, from the source database to the target database.

Block 360 shows the mapping process. For example, as shown, for each of a plurality of tables in the target database (i.e. a target table), the source tables/columns are identified. Specifically, as shown, for each of N target tables, the sources table and columns are identified in the mapping process. Once the query is framed, the query is executed. As shown in block 370 of FIG. 3, an apparatus, such as 200, may be configured for executing query and/or fetching data, from, for example, source database 320. Subsequently, as shown in block 375 of FIG. 3, an apparatus, such as 200, may be configured for using user defined function(s) to process data. For example, as shown in more detail below and in particular in FIG. 5, the apparatus may be configured for supporting various user defined functions such as supporting constant values, manipulating values of specified fields, identifying multiple source databases, parallel execution, and maintaining referential integrity. That is, as shown in block 380 of FIG. 3, an apparatus, such as 200, may be configured for determining function(s) to process in data in required format and as shown in block 385 of FIG. 3, an apparatus, such as 200, may be configured for determining functions ranging from constant to formulae.

After querying the source database(s) and processing the data utilizing the user defined functions, the data may be, for example, converted into a format consistent with insertion into the destination database(s). That is, as shown in block 390 of FIG. 3, an apparatus, such as 200, may be configured for framing data into, for example, SQL insert format. Finally, as shown in block 395 of FIG. 3, an apparatus, such as 200, may be configured for storing the data in target database 330. In some embodiments, the insert format is achieved by identifying the source database type and converting the data to that of destination database type by, for example, calling one of a plurality of functions, each function configured for converting data of one type to another. For example, a first function that is called when JSON data is being migrated to MySQL, a second for when MySQL is being migrated to PostgreSQL, etc. For example, in an embodiment in which source data is of a first type (e.g., JSON), the configuration file may comprise a flag or the like stating "is the input file of the first file type", and if yes or in an instance in which a yes is returned, while running the migration program, a function may be called which, for example, takes the file name as an input and within the function, the data of the first file type is transferred or written directly to the target database. The function name will be similar to processSQLFile similar like processJSONFile

```
public function processJSONFile($SQLFileName){
    ...
    ...
    ...
}
```

Database Migration

FIG. 4 illustrates a flow diagram depicting an example of a process 400 for facilitating database migration in accordance with embodiments of the present invention. Specifically, process 400 illustrates an embodiment in which a configurable and incremental database migration framework may be used to perform heterogeneous database migration. The process 400 may be performed by an apparatus, such as the apparatus 200 described above with respect to FIG. 2 and database connection/data migration may take place via any network connection (e.g., WIFI, hardwired or cellular).

As will be shown below, a migration configuration file may be utilized to identify source database(s) and destination databases, the migration configuration file comprises information identifying one or more source databases and one or more destination databases. To generate the migration configuration file, database connection information may be first received. As shown in block 410 of FIG. 4, an apparatus, such as apparatus 200, may be configured for receiving source database connection information. As shown in block 420 of FIG. 4, an apparatus, such as apparatus 200, may be configured for receiving destination database connection information. In some embodiments, in an instance in which data may be migrated to (and/or from) a plurality of databases, one or more destination database connections (and/or one or more source database connections) may be specified. In an exemplary embodiment, to receive the source and/or destination database connection information, the apparatus may be configured to provide, for display at a user device, a user interface comprised of user-fillable and/or user-selectable portions. For example, the user interface may be configured to display user-fillable and/or user-selectable portions configured to receive information regarding a username and password. The apparatus may then be configured to receive and subsequently store the user input. For example, a user may input the username and password, which the apparatus subsequently stores in a migration configuration file. In some embodiments, as shown in FIG. 3 above, the apparatus may be configured to check the database configuration information to, for example, confirm accessibility.

As shown in block 430 of FIG. 4, an apparatus, such as apparatus 200, may be configured for accessing, for example, the migration configuration file, to read and/or identify connection information for the one or more source database(s) and one or more destination database(s). As shown in block 440 of FIG. 4, an apparatus, such as apparatus 200, may be configured for reading migration configuration file (e.g., migration_configuration.php). In some embodiments, the migration configuration file generated may be generated locally, whereas in other embodiments, the migration configuration file may be generated at a remote server. Similarly, the migration configuration file may be stored locally, whereas in other embodiments, the migration configuration file may be stored remotely. That is, the migration configuration file may be generated and/or stored at the device at which the user is directing the process or at a remote server that, for example, hosts the heterogeneous database migration framework.

In some embodiments, a connection file may be different than the migration configuration file and may comprise connection related information (username, passwords, etc.) In an exemplary embodiment, security requirements may require generation and/or storage of one or both either locally or remotely. During execution, a call to one or both of the connection file or the migration configuration file may be made.

In some embodiments, the types of databases may be different. For example, a first database (i.e. the type of the first database) may be, for example, MySQL while the second database type (i.e. the type of the second database) may be, for example, PostgreSQL. While embodiments disclosed herein discuss various methods that may be employed in the event that the databases are of different types, it should be understood that the databases may also, in some embodiments, be of the same or similar type.

In an exemplary embodiment, a function in which the source database connection is defined as get_ID_connection( ) and the function in which the destination database connection(s) is defined as get_CD_connection( ). Specifically, the functions may be defined as

```
<?php
function get_ID_connection( ) {
    $tw_mysql_db_hostname = "localhost";
    $tw_mysql_db_username = "root";
    $tw_mysql_db_password = "R00T321";
    $tw_mysql_db_database = "webgroupon";
```

-continued

```
// Check TW DB connection
$my_con = new mysqli($tw_mysql_db_hostname,
$tw_mysql_db_username, $tw_mysql_db_password);
$my_con→set_charset('utf8');
if ($my_con) {
    return $my_con;
} else {
    echo "Connection failed with Indonesia
        database.".$my_con→connect_error;
}
}
function get_CD_connection( ) {
    //CD DB Config setting
    $cd_postgres_db_hostname = "localhost";
    $cd_postgres_db_username = "stardeals";
    $cd_postgres_db_password = "stardeals";
    $cd_postgres_db_name="t_stardeals_asia";
    // Check CD DB connection
    $conn_string = "host=$cd_postgres_db_hostgame port=5432
        dbname=$cd_postgres_db_name
        user=$cd_postgres_db_username
    $pg_con = pg_connect($conn_string);
    if ($pg_con) {
        return $pg_con;
    } else {
        echo "Connection failed with CityDeals database.";
    }
}
```

Figure 5:
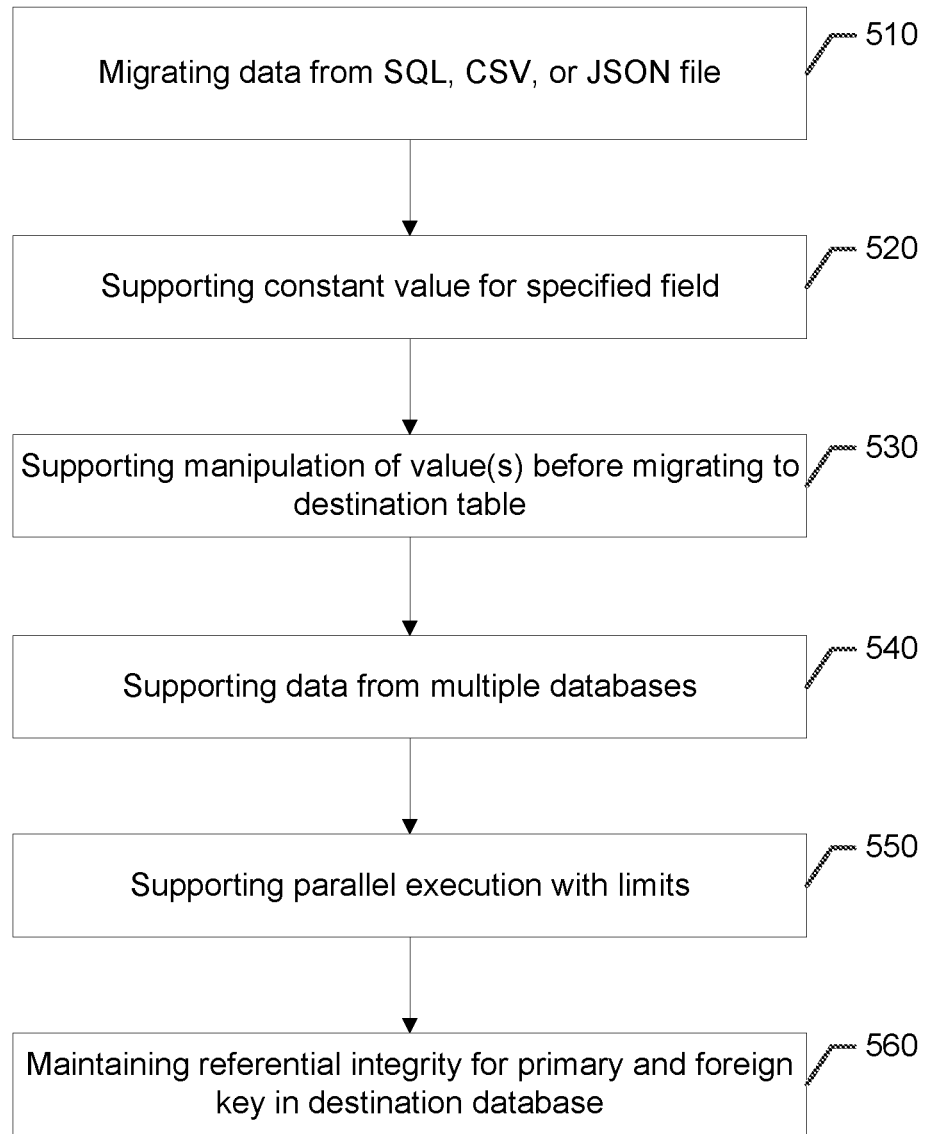

As shown in block 450 of FIG. 4, an apparatus, such as apparatus 200, may be configured for mapping tables and/or traversing each table and column level configuration. That is, details regarding source database configuration and/or destination database configuration may identified and implemented. As such, depending on one or more particular requirements, the apparatus may be configured to perform the source database configuration and/or destination database configuration. FIG. 5 shows a flow diagram depicts an example process 500 identifying a number of uses cases for which configuration may be performed, in accordance with embodiments of the present invention.

The process 500 may be performed by an apparatus, such as the apparatus 200 described above with respect to FIG. 2. As shown in block 510 of FIG. 5, an apparatus, such as apparatus 200, may be configured for migrating data from, for example, SQL, CSV, or JSON. For example, the apparatus may be configured to enable specification and/or specify a different input format to import data to the destination from a file.

```
'std_data.appdomains' => array (
    'migrateData' => true,
    'isSQLFile' => true,
    'SQLFileName' => "std_data_—appdomains.sql"
),
```

As shown in block 520 of FIG. 5, an apparatus, such as apparatus 200, may be configured for supporting a constant value. For example, as shown below, the apparatus may be configured to specify a constant value for some of the fields in configuration.

```
'u_appdomain_id'=>array(
    'mapping'=>'40',
    'isConstant'=>true,
),
```

As shown in block 530 of FIG. 5, an apparatus, such as apparatus 200, may be configured for supporting manipulation of values before migrating to the destination table. That is, for example, as shown below, the apparatus may be configured to apply one or more different functions and manipulate a value for each column for each row before inserting it into destination table.

```
'dm_merchant_welcome_message'=>array(
    'mapping'=>'webgroupon.companyinfo.companyinfo',
    'function'=>'stripTo250',
),
```

As shown in block 540 of FIG. 5, an apparatus, such as apparatus 200, may be configured for supporting data from multiple databases. For example, as shown below, the apparatus may be configured to join tables, take data from different source database(s) and take selected fields to map to specified fields in the destination table.

```
'from'=>'FROM webgroupon.promo',
'join'=>'LEFT JOIN webgroupon.ptc_city_mapping ON
webgroupon.pr
    . 'LEFT JOIN webgroupon.auto_inc_mapping_deal_merchant
'where'=>'WHERE 1 AND webgroupon.promo.id_company = 1 ',
'order_by'=>'ORDER BY webgroupon.promo.id_promo DESC ',
```

As shown in block 550 of FIG. 5, an apparatus, such as apparatus 200, may be configured for supporting parallel execution. For example, as shown below, the apparatus may be utilized to execute database migration in parallel in batch by, for example, applying a limit (e.g., to the number of parallel migrations), which may increase the speed of processing.

```
'from'=>'FROM webgroupon.purchase',
'join'=>'LEFT JOIN webgroupon.auto_inc_mapping_user ON
webgroupon
    . ' LEFT JOIN webgroupon.auto_inc_mapping_city_deals ON
        webgroupon
    . ' LEFT JOIN webgroupon.paymenttrack ON
        webgroupon.paymenttrack
    . ' LEFT JOIN webgroupon.auto_inc_mapping_users_billing_history
        ON webgroupon
'where'=>'WHERE 1',
//'order_by'=>'ORDER BY webgroupon.datauser.id DESC',
'limit'=>'LIMIT 0,5',
```

As shown in block 560 of FIG. 5, an apparatus, such as apparatus 200, may be configured for maintaining referential integrity for a primary and foreign key in the destination database. For example, as shown below, in some embodiments, the apparatus may be configured to create a temporary table to maintain a relation between a primary key in a source table and a destination table, which may be used to maintain referential integrity in destination table during migration.

```
'from'=>'FROM webgroupon.datauser',
//'join'=>'LEFT JOIN webgroupon.userdetaildata ON
webgroupon.dataus
'where'=>'WHERE 1',
'order_by'=>'ORDER BY webgroupon.datauser.id_user DESC',
'limit'=>'LIMIT 0,5',
'auto_inc_mapping_table'=>'webgroupon.auto_inc_mapping_users'
```

In some embodiments, according to a mapping table, the apparatus may be configured to generate a query which may be configured to refer a primary key from a auto increment table (auto_inc_mapping_users).

A utility library (or function library) may be provided/utilized to define functions for utilization in migration configuration mapping which may be used to manipulate field values or in some embodiments, manipulate data values stored in a source database table or any data exchange formats (e.g., XML, JSON, CSV, etc.) in advance of causing storage of the data in the destination database table. The complexity of the manipulation can range from simple to more complex. For example, as show below, the function library may include a function to modify a birth date to a required format. Based on the source database type and the destination database type, the apparatus may be configured to determine whether to call this particular function. That is, where data migration is being performed and the apparatus identifies that particular information (e.g., a birth date) is stored in a first particular format in the source database, a function may be called in the mapping process to manipulate the field values so to be able to be stored in a second particular format as required by the destination database.

```
-continued $row['u_sex'] = empty($row['u_sex']) ? 'm' : $row['u_sex'];
    if(strlen($row['u_sex']) != mb_strlen($row['u_sex'],
    'utf-8')) {
    }
}
function stripTo250(&$row){
    $row['dm_merchant_welcome_message'] =
        substring($row['dm_merchant_welcome_message'], 0,
        250);
}
```

Returning back to FIG. 4, as shown in block 460 of FIG. 4, an apparatus, such as apparatus 200, may be configured for creating/generating a query on each of one or more source database(s). As shown in block 470 of FIG. 4, an apparatus, such as apparatus 200, may be configured for executing the query on the source database(s). As shown in block 480 of FIG. 4, an apparatus, such as apparatus 200, may be configured for populating one or more temporary table(s) if, for example, table is having primary key to maintain referential integration. An example query is shown below and refers to a temporary table.

```
SELECT qpod_full.auto_inc_mapping_users.new_auto_inc_id AS
ucd_user_id, qpod_full.user_address.zip AS ucd_postal_code,
qpod_full.user_address.city AS ucd_cityname,
SUBSTRING(CONCAT(qpod_full.user_address.address1, '', '',
qpod_full.user_address.address2) , 1, 256) AS ucd_streetname,
qpod_full.user_address.address1 AS ucd_street_number,
SUBSTRING(qpod_full.user_address.tel, 1, 32) AS ucd_phone_number,
qpod_full.user_address.reg_time AS ucd_last_modified, 'false' AS
ucd_mobile_verificated, qpod_full.user_address.reg_time AS ucd_created FROM
qpod_full.user_address JOIN qpod_full.auto_inc_mapping_users ON
qpod_full.user_address.user_id =
qpod_full.auto_inc_mapping_users.orig_auto_inc_id WHERE
qpod_full.user_address.is_master = 'YES' AND qpod_full.user_address.is_pub =
'YES' AND (qpod_full.user_address.reg_time >= '2016-01-31 00:00:00') ORDER BY
qpod_full.user_address.user_id ASC
```

As also shown below, the function library may include a function to convert Taiwanese characters (e.g., a gender as indicated in TW) to a gender in English (e.g., M (male) or F (female)). Furthermore, the library may include a function, also shown below, that may be utilized to reduce the amount of characters to a given number (e.g., 250). As one of ordinary skill in the art would appreciate, the utility library may include any function enabling the manipulation of data from a source database to an insert format required by the destination database.

```
//Function to get the birthdate in required format
function setUserBirthday(&$row) {
    if(!empty($row['skip_u_birthday_year']) &&
        !empty($row['skip_u_birthday_month']) &&
        !empty($row['skip_u_birthday_day'])
    $row['u_birthday'] = $row[skip_u_birthday_year'].'-
        '.$row[skip_u_birthday_month'].'-
        '.$row[skip_u_birthday_day'].
    }
    $row['u_birthday'] = '2014-04-23';
    //$row['u_created'] = '2015-04-22 10:43:23.518456+00';
}
//Function to convert TW gender to CD m / f value
function setDefaultSex(&$row) {
```

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be

The invention claimed is:

1. An apparatus for facilitating heterogeneous database migration, the apparatus comprising at least one processor and at least one memory including computer program code, the at least one memory and the computer program code configured to, with the processor, cause the apparatus to at least:
  generate each of a plurality of queries needed to facilitate the heterogeneous database migration, each query of the plurality of queries being a function of a source database type and a destination database type, and wherein each query is directed to a particular combination of a particular source database and a particular destination database,
  wherein generation of the plurality of queries comprises:
    analyzing the particular source database and the particular target database to produce configuration data, the configuration data used for generating a mapping to enable the migration of at least one table, or portion thereof, from the particular source database to the particular target database;
  wherein generation of the mapping comprises:
    for each of the plurality of destination database tables, identify one or more particular source database tables and particular columns of each of the one or more particular source database tables from which the source data will be migrated;
    for each of the identified one or more particular source database tables and particular columns of the one or more particular source database tables from which the source data will be migrated, determine, based on the source database type and the destination database type, determine at least one particular function of a plurality of functions defined in the utility library to call, as able to manipulate particular information stored as the source data of the source database type in the one or more particular source database tables and particular columns for migration to the destination database table as the destination database type; and
  apply each of the determined functions for supporting data migration from the one or more particular source database tables and particular columns of the one or more particular source database tables, each of the one or more different functions configured for supporting data migration from at least one of the one or more particular source database tables and particular columns of the one or more particular source database tables.

2. The apparatus according to claim 1, wherein the at least one memory and the computer program code are further configured to, with the processor, cause the apparatus to:
  generate a migration configuration file by receiving connection information for accessing each of the one or more source databases, receiving connection information for accessing each of one or more destination databases, and confirming connectivity to each of the one or more source databases and each of the one or more destination databases,
  wherein the migration configuration file comprises information indicative of at least the particular source database type of the one more source databases, connection information of accessing each particular source database, a destination database type of each particular destination database of the one more destination databases, and connection information for accessing each particular destination database, and
  wherein the source database type comprises source data of a first type and the destination database type specifies source data of a second type, wherein the first type is different from the second type.

3. The apparatus according to claim 1, wherein the at least one memory and the computer program code are further configured to, with the processor, cause the apparatus to:
  generate a utility library to define functions for utilization in migration configuration mapping, including functions for manipulating field values and manipulating data values stored in each of a plurality of source database tables and any data exchange formats in advance of causing storage of data in each of a plurality of destination database tables.

4. The apparatus according to claim 1, wherein the at least one memory and the computer program code are further configured to, with the processor, cause the apparatus to:
  execute each of a plurality of queries to extract data;
  frame the data into an insert format; and
  cause storage of the data, in the insert format, in the destination database.

5. The apparatus according to claim 4, wherein the at least one memory and the computer program code configured for framing the query is further configured to, with the processor, cause the apparatus to:
  call a function for manipulating data values stored in the source database table or any data exchange formats in advance of causing storage of the data in the destination database table.

6. The apparatus according to claim 1, wherein the at least one memory and the computer program code configured for framing the query is further configured to, with the processor, cause the apparatus to:
  maintain, during migration, referential integrity by creating a temporary table configured to maintain a relation between a primary key in the source database table and a foreign key in the destination database table.

7. The apparatus according to claim 1, wherein the at least one memory and the computer program code configured for framing the query is further configured to, with the processor, cause the apparatus to:
  apply a limit to a number of parallel migrations to increase a speed of the migration.

8. A method for facilitating heterogeneous database migration, the method comprising:
  generating each of a plurality of queries needed to facilitate the heterogeneous database migration, each query of the plurality of queries being a function of a source database type and a destination database type, and wherein each query is directed to a particular combination of a particular source database and a particular destination database,
  wherein generation of the plurality of queries comprises:
    analyzing the particular source database and the particular target database to produce configuration data, the configuration data used for generating a mapping to enable the migration of at least one table, or portion thereof, from the particular source database to the particular target database;
    wherein generation of the mapping comprises:
      for each of the plurality of destination database tables, identifying one or more particular source database tables and particular columns of each of the one or more particular source database tables from which the source data will be migrated;
      for each of the identified one or more particular source database tables and particular columns of the one or more particular source database tables from which the source data will be migrated, determine, based on the source database type and the destination database type, determining at least one particular function of a plurality of functions defined in the utility library to call, as able to manipulate particular information stored as the source data of the source database type in the one or more particular source database tables and particular columns for migration to the destination database table as the destination database type; and
  applying each of the determined functions for supporting data migration from the one or more particular source database tables and particular columns of the one or more particular source database tables, each of the one or more different functions configured for supporting data migration from at least one of the one or more particular source database tables and particular columns of the one or more particular source database tables.

9. The method according to claim 8, further comprising:
  generating a migration configuration file by receiving connection information for accessing each of the one or more source databases, receiving connection information for accessing each of one or more destination databases, and confirming connectivity to each of the one or more source databases and each of the one or more destination databases,
  wherein the migration configuration file comprises information indicative of at least the particular source database type of the one more source databases, connection information of accessing each particular source database, a destination database type of each particular destination database of the one more destination databases, and connection information for accessing each particular destination database, and
  wherein the source database type comprises source data of a first type and the destination database type specifies source data of a second type, wherein the first type is different from the second type.

10. The method according to claim 8, further comprising:
  generating a utility library to define functions for utilization in migration configuration mapping, including functions for manipulating field values and manipulating data values stored in each of a plurality of source database tables and any data exchange formats in advance of causing storage of data in each of a plurality of destination database tables.

11. The method according to claim 8, further comprising:
  executing each of a plurality of queries to extract data;
  framing the data into an insert format; and
  causing storage of the data, in the insert format, in the destination database.

12. The method according to claim 11, wherein framing the further comprises:
  calling a function for manipulating data values stored in the source database table or any data exchange formats in advance of causing storage of the data in the destination database table.

13. The method according to claim 11, wherein framing the further comprises:
  maintaining, during migration, referential integrity by creating a temporary table configured to maintain a relation between a primary key in the source database table and a foreign key in the destination database table.

14. The method according to claim 8, further comprising:
  applying a limit to a number of parallel migrations to increase a speed of the migration.

15. A computer program product for facilitating heterogeneous database migration, computer program product comprising at least one non-transitory computer-readable storage medium having computer-executable program code instructions stored therein, the computer-executable program code instructions comprising program code instructions for:
  generating each of a plurality of queries needed to facilitate the heterogeneous database migration, each query of the plurality of queries being a function of a source database type and a destination database type, and wherein each query is directed to a particular combination of a particular source database and a particular destination database,
  wherein generation of the plurality of queries comprises:
    analyzing the particular source database and the particular target database to produce configuration data, the configuration data used for generating a mapping to enable the migration of at least one table, or portion thereof, from the particular source database to the particular target database;

wherein generation of the mapping comprises:

for each of the plurality of destination database tables, identifying one or more particular source database tables and particular columns of each of the one or more particular source database tables from which the source data will be migrated;

for each of the identified one or more particular source database tables and particular columns of the one or more particular source database tables from which the source data will be migrated, determine, based on the source database type and the destination database type, determining at least one particular function of a plurality of functions defined in the utility library to call, as able to manipulate particular information stored as the source data of the source database type in the one or more particular source database tables and particular columns for migration to the destination database table as the destination database type; and applying each of the determined functions for supporting data migration from the one or more particular source database tables and particular columns of the one or more particular source database tables, each of the one or more different functions configured for supporting data migration from at least one of the one or more particular source database tables and particular columns of the one or more particular source database tables.

16. The computer program product according to claim 15, wherein the computer-executable program code instructions further comprise program code instructions for:

generating a migration configuration file by receiving connection information for accessing each of the one or more source databases, receiving connection information for accessing each of one or more destination databases, and confirming connectivity to each of the one or more source databases and each of the one or more destination databases, wherein the migration configuration file comprises information indicative of at least the particular source database type of the one more source databases, connection information of accessing each particular source database, a destination database type of each particular destination database of the one more destination databases, and connection information for accessing each particular destination database, and wherein the source database type comprises source data of a first type and the destination database type specifies source data of a second type, wherein the first type is different from the second type.

17. The computer program product according to claim 15, wherein the computer-executable program code instructions further comprise program code instructions for:

generating a utility library to define functions for utilization in migration configuration mapping, including functions for manipulating field values and manipulating data values stored in each of a plurality of source database tables and any data exchange formats in advance of causing storage of data in each of a plurality of destination database tables.

18. The computer program product according to claim 15, wherein the computer-executable program code instructions further comprise program code instructions for:

executing each of a plurality of queries to extract data;
framing the data into an insert format; and
causing storage of the data, in the insert format, in the destination database.

19. The computer program product according to claim 18, wherein framing the further comprises:

calling a function for manipulating data values stored in the source database table or any data exchange formats in advance of causing storage of the data in the destination database table.

20. The computer program product according to claim 18, wherein framing the further comprises:

maintaining, during migration, referential integrity by creating a temporary table configured to maintain a relation between a primary key in the source database table and a foreign key in the destination database table.

21. The computer program product according to claim 15, wherein the computer-executable program code instructions further comprise program code instructions for:

applying a limit to a number of parallel migrations to increase a speed of the migration.

* * * * *